United States Patent
Nayak et al.

(10) Patent No.: US 6,744,593 B1
(45) Date of Patent: Jun. 1, 2004

(54) TAPE PATH FOR A CARTRIDGE TAPE DRIVE

(75) Inventors: Ashok B. Nayak, Glendora, CA (US); Robert R. Heinze, San Clemente, CA (US); Minh M. Vu, Midway City, CA (US); Son Hung Truong, Westminster, CA (US); James M. Decot, Fountain Valley, CA (US); John A. Hamming, Laguna Niguel, CA (US); Robert Lindner, Mission Viejo, CA (US)

(73) Assignee: Seagate Technology LLC., Scotts Valley, CA (US)

( * ) Notice: Subject to any disclaimer, the term of this patent is extended or adjusted under 35 U.S.C. 154(b) by 401 days.

(21) Appl. No.: 09/689,837

(22) Filed: Oct. 13, 2000

Related U.S. Application Data

(60) Provisional application No. 60/186,772, filed on Mar. 3, 2000.

(51) Int. Cl.$^7$ ............................................. G11B 15/60
(52) U.S. Cl. ............... 360/95; 360/130.21; 360/130.31; 242/348
(58) Field of Search ............................. 360/90, 93, 95, 360/130.21, 130.31, 130.32; 242/348, 348.3, 332, 332.4, 332.5, 332.7, 332.8

(56) References Cited

U.S. PATENT DOCUMENTS

| | | | | |
|---|---|---|---|---|
| 3,934,840 A | * | 1/1976 | Inaga | 242/332.4 |
| 4,608,614 A | * | 8/1986 | Rinkleib et al. | 360/95 |
| 5,173,828 A | * | 12/1992 | Tanzer et al. | 360/130.21 |
| 5,581,419 A | * | 12/1996 | Kobayashi | 360/71 |
| 5,754,361 A | * | 5/1998 | Sakai et al. | 360/95 |
| 6,034,839 A | * | 3/2000 | Hamming | 360/95 |
| 6,118,630 A | * | 9/2000 | Argumedo | 360/130.21 |

FOREIGN PATENT DOCUMENTS

| | | | |
|---|---|---|---|
| JP | 8-194996 | * | 7/1996 |
| JP | 8-195063 | * | 7/1996 |
| JP | 9-185858 | * | 7/1997 |
| JP | 9-321718 | * | 9/1997 |

* cited by examiner

*Primary Examiner*—David Ometz
(74) *Attorney, Agent, or Firm*—McDermott, Will & Emery

(57) ABSTRACT

A tape drive having a cartridge receiving area for receiving a cartridge containing a recording medium on a supply reel is disclosed. The tape drive has a take-up reel. The take-up reel includes a take-up rotatably mounted to the tape drive and a pair of flanges mounted on either side of the take-up hub. A magnetic read/write head is disposed between the cartridge receiving area and the take-up reel. A pair of fixed guide assemblies is disposed symmetrically about the magnetic read/write head. Each of the fixed guide assemblies has a fixed guide mount fixed to the tape drive, a fixed guide attached to a top of the fixed guide mount, and a spring/pressure pad having at least one pressure pad mounted to the fixed guide, wherein the pressure pad applies pressure to a top edge of the recording medium when the tape drive is operational. The tape drive also has a forward guide roller and a rearward guide roller disposed symmetrically about the magnetic read/write head. The forward guide roller is located between the cartridge receiving area and the one of the pair of fixed guide assemblies and the rearward guide roller is located between the take-up reel and the other of the fixed guide assemblies. Each of the forward guide roller and rearward guide roller includes a shaft mounted to the tape drive and a rotor disposed about the shaft.

15 Claims, 7 Drawing Sheets

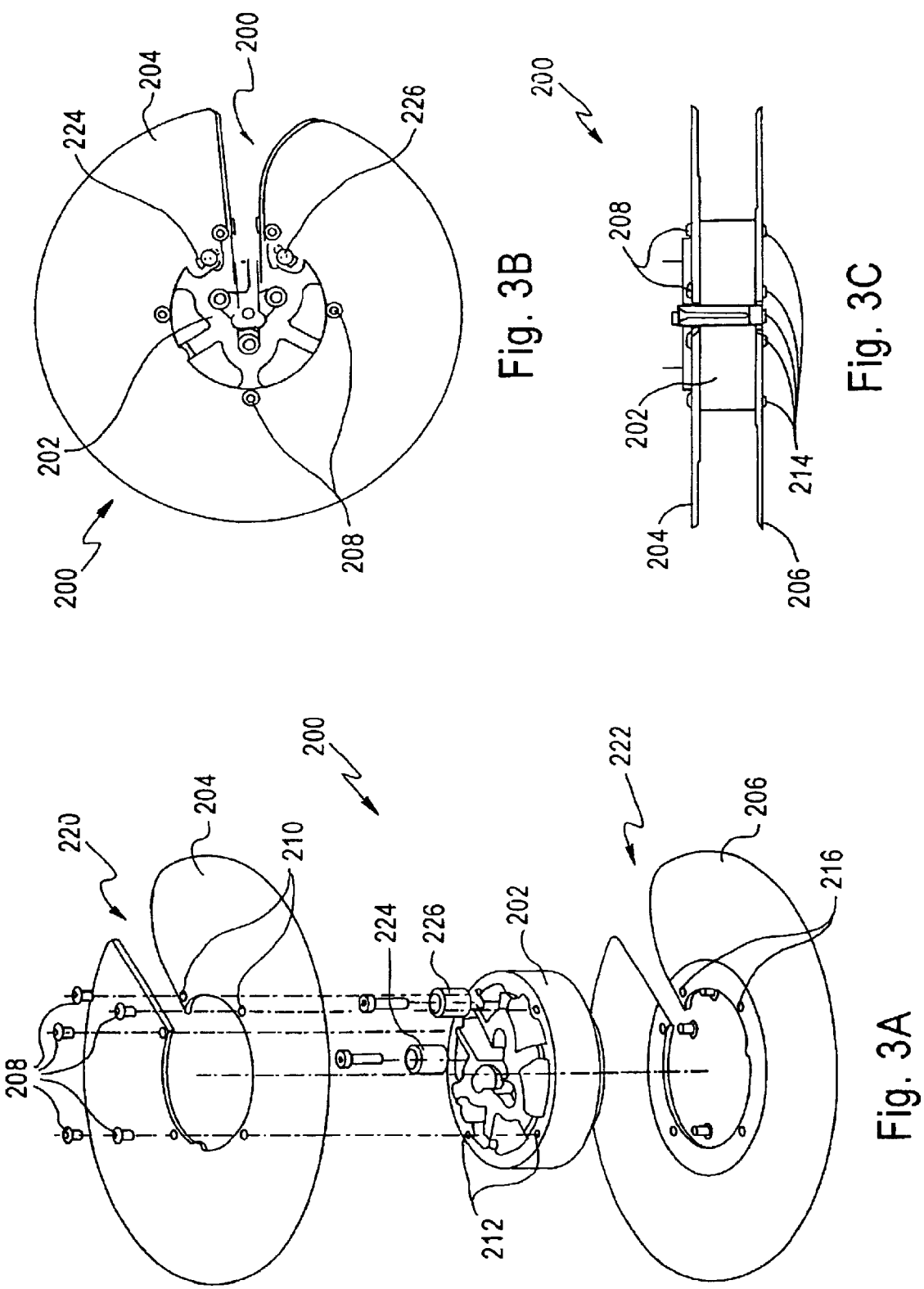

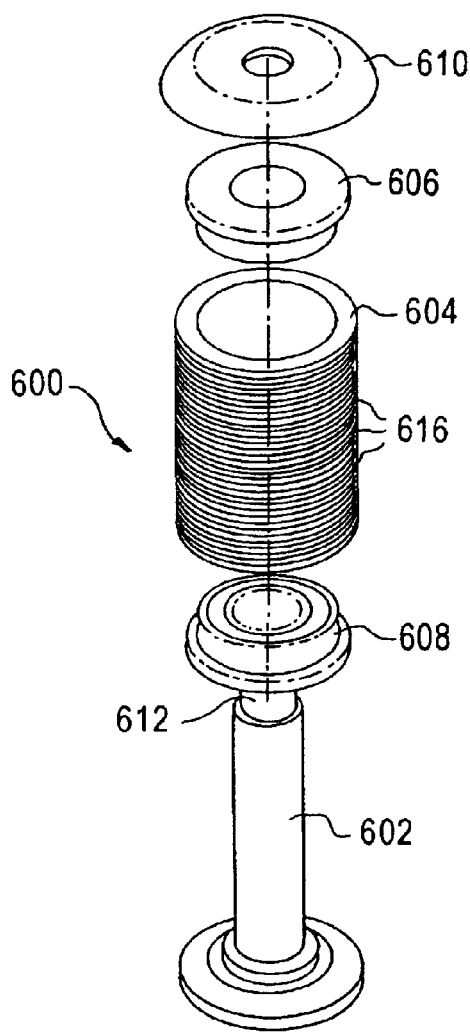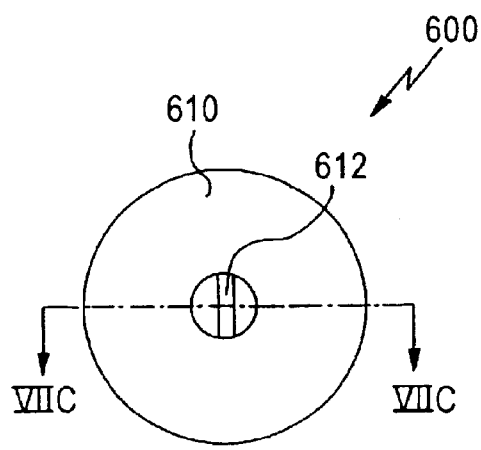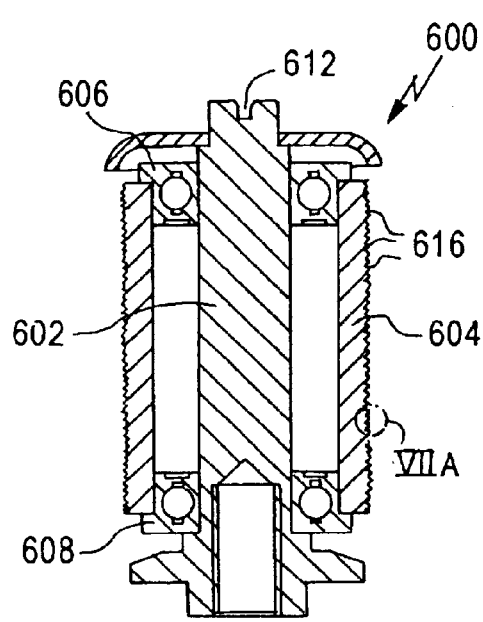
Fig. 7A
Fig. 7B
Fig. 7C

TAPE PATH FOR A CARTRIDGE TAPE DRIVE

CROSS REFERENCE TO RELATED APPLICATION

This application claims the benefit of U.S. Provisional Application Ser. No. 60/186,772, filed Mar. 3, 2000, the contents of which are hereby incorporated by reference.

FIELD OF THE INVENTION

The invention relates to a magnetic tape drive device used in conjunction with single reel tape cartridges and, more particularly, to a tape path for such a tape drive device.

DESCRIPTION OF RELATED ART

Tape drive devices for storing magnetic data are well known in the art. In the forward move, tape is moved from a supply reel, which supplies the tape, to a take-up reel, which draws tape from the supply reel along the tape path and over the magnetic read/write head. In the reverse mode, tape is moved from the take-up reel to the supply reel.

Tape cartridge configurations for data storage generally fall into one of two categories. In the first category, both reels are located inside a single magazine or cartridge, that is, the supply reel and the take-up reel are contained within a single housing. In the forward read/write mode, the tape moves from the supply reel to the take-up reel in a single housing and vice versa in the reverse mode. The read/write head is located in the tape drive separate from the tape cartridge. Examples of such cartridges include quarter-inch cartridges ("QIC"), digital audio tape ("DAT") cartridges, and audio/video cassettes.

The second category of tape cartridge configurations has only a single reel, generally the supply reel, in the cartridge or magazine. This type of cartridge is used with a tape drive having a take-up reel permanently housed in the tape drive unit. In such tape drives, the tape cartridge is inserted into the tape drive unit. The cartridge is then registered and the front end, or leader end, of the tape is transferred from the supply reel along the tape path of the tape drive to the take-up reel. The magnetic read/write head, which reads or writes to the tape, is located along the tape path and the take-up reel serves to draw the tape across the magnetic read/write head. Examples of such cartridges include DLT (Digital Linear Tape) cartridges made by Quantum, 3480/3490 cartridges made by IBM, and LTO (Linear Tape Open) cartridges to be made by Seagate Technologies, Inc., Hewlett Packard, and IBM.

There are a number of single reel tape cartridges available in the marketplace. Tape drives that work in conjunction with such cartridges have a take-up reel located inside the tape drive housing and should have a suitable tape path for proper tape handling. The tape paths of these tape drives provide many, if not all, of the following features:

- a proper wrap angle to the read/write head;
- the ability to filter out axial runout of the reels/motors as the tape moves from a reel to the head (i.e., the tape path must move the tape in a reasonably straight path);
- minimization of, and the effects of, misalignment between the reels;
- minimization of drops in the tape tension along tape guiding elements as the tape travels from one of the reels to the read/write head;
- minimization of tape wear at the media surface and at its edges;
- operation in a rapid start/stop mode;
- minimization of shifting in the tape position when the tape changes from a forward direction to a reverse direction, or vice versa;
- a suitable surface under varying humidity and temperature conditions to ensure that the tape does not stick to the guiding elements; and
- a suitable surface to conduct electrostatic charges that build up on the tape surfaces.

To achieve the above features, tape paths generally have a combination of tape guiding elements or members. Examples of these guiding elements include flanged or flange-less guide rollers, fixed guides, and air bearing guides.

One known tape path is disclosed in U.S. Pat. No. 5,414,585, which uses a large number of tape guide rollers to guide the tape along the tape path from the supply reel to the take-up reel. One of the problems associated with this design is the large initial motor current that is required to overcome the mass moment of inertia of the rotating guide elements. As a result, for a rapid start/stop requirement, this device has present potential problems.

Moreover, depending on tolerances allowed during fabrication of this type of tape drive, each of the guide rollers may contribute to error in the tape path, rather than eliminate the error. Also, these tape guide rollers use precision ball bearings, which must be lubricated to reduce wear and, subsequently, raise the possibility of failure. The motors in these tape drives also must produce a certain amount of torque to overcome the drag produced by the rollers, thus requiring higher torque motors.

Another known tape drive with its associated tape path is described in U.S. Pat. No. 5,224,641 (also U.S. Pat. No. 4,842,177), in which the drive utilizes air bearing guides as its guide elements. Air bearing guides are advantageous in that they are highly reliable, provide excellent tape guiding, and result in very low stiction. There are problems, however, with air bearing guides because, foremost, they utilize an air pump and must have the necessary plumbing to get the air from the air pump to the air bearing. Modem computers, however, are very constrained with respect to space and tape drives must satisfy a certain form factor. As a result, if the form factor of the tape drive is small, then air bearing guides are not a good solution because of the space required to house the air pump and the associated plumbing elements. In addition, tape drives that utilize air bearing guides are very expensive.

Tape drives having tape paths that utilize only fixed guides are well known in the art, but have many problems. In such tape drives, a well designed tape path has a maximum length of tape between the supply reel and the take-up reel. Fixed guides produce friction in the tape path, a problem that is considerably more serious in humid environments. Stiction is exacerbated if the angle that the tape must wrap around the fixed guide (i.e., the "wrap angle") is large and/or if the contact area is large.

SUMMARY OF THE INVENTION

There is a need for a single reel cartridge tape drive that fits into a limited space, i.e., fits within a limited form factor (e.g., the 5.25 inch form factor or 5.75" wide×8" deep).

These and other needs are met by an embodiment of the invention, which provides a tape drive having a cartridge receiving area adapted to receive a cartridge containing a recording medium on a supply reel. The tape drive has a take-up reel, a magnetic read/write head disposed between the cartridge receiving area and the take-up reel, a pair of fixed guide assemblies disposed symmetrically about the magnetic read/write head, and a forward guide roller and a rearward guide roller disposed symmetrically about the magnetic read/write head. The forward guide roller is located between the cartridge receiving area and the one of the pair of fixed guide assemblies and the rearward guide roller is located between the take-up reel and the other of the fixed guide assemblies.

Another preferred embodiment provides a tape drive having a cartridge receiving area for receiving a cartridge containing a recording medium on a supply reel is disclosed. The tape drive has take-up reel. The take-up reel includes a take-up rotatably mounted to the tape drive and a pair of flanges mounted on either side of the take-up hub. A magnetic read/write head is disposed between the cartridge receiving area and the take-up reel. A pair of fixed guide assemblies is disposed symmetrically about the magnetic read/write head. Each of the fixed guide assemblies has a fixed guide mount fixed to the tape drive, a fixed guide attached to a top of the fixed guide mount, and a spring/pressure pad having at least one pressure pad mounted to the fixed guide, wherein the pressure pad applies pressure to a top edge of the recording medium when the tape drive is operational. The tape drive also has a forward guide roller and a rearward guide roller disposed symmetrically about the magnetic read/write head. The forward guide roller is located between the cartridge receiving area and the one of the pair of fixed guide assemblies and the rearward guide roller is located between the take-up reel and the other of the fixed guide assemblies. Each of the forward guide roller and rearward guide roller includes a shaft mounted to the tape drive and a rotor disposed about the shaft.

Additional advantages and novel features of the invention are set forth in the following description and will become apparent to those of ordinary skill in the art from the following description or through practice of the invention. The advantages of the invention may be realized and attained through the instrumentalities and combinations pointed out in the appended claims.

BRIEF DESCRIPTION OF THE DRAWINGS

The following detailed description of the embodiments of the invention is best understood when read in conjunction with the accompanying drawings, in which:

FIGS. 3A–3C are several views of the take-up reel assembly of FIG. 1;

FIGS. 7A–7C are several views of the rearward guide roller assembly of FIG. 1.

DETAILED DESCRIPTION OF THE PREFERRED EMBODIMENTS

Figure 1:
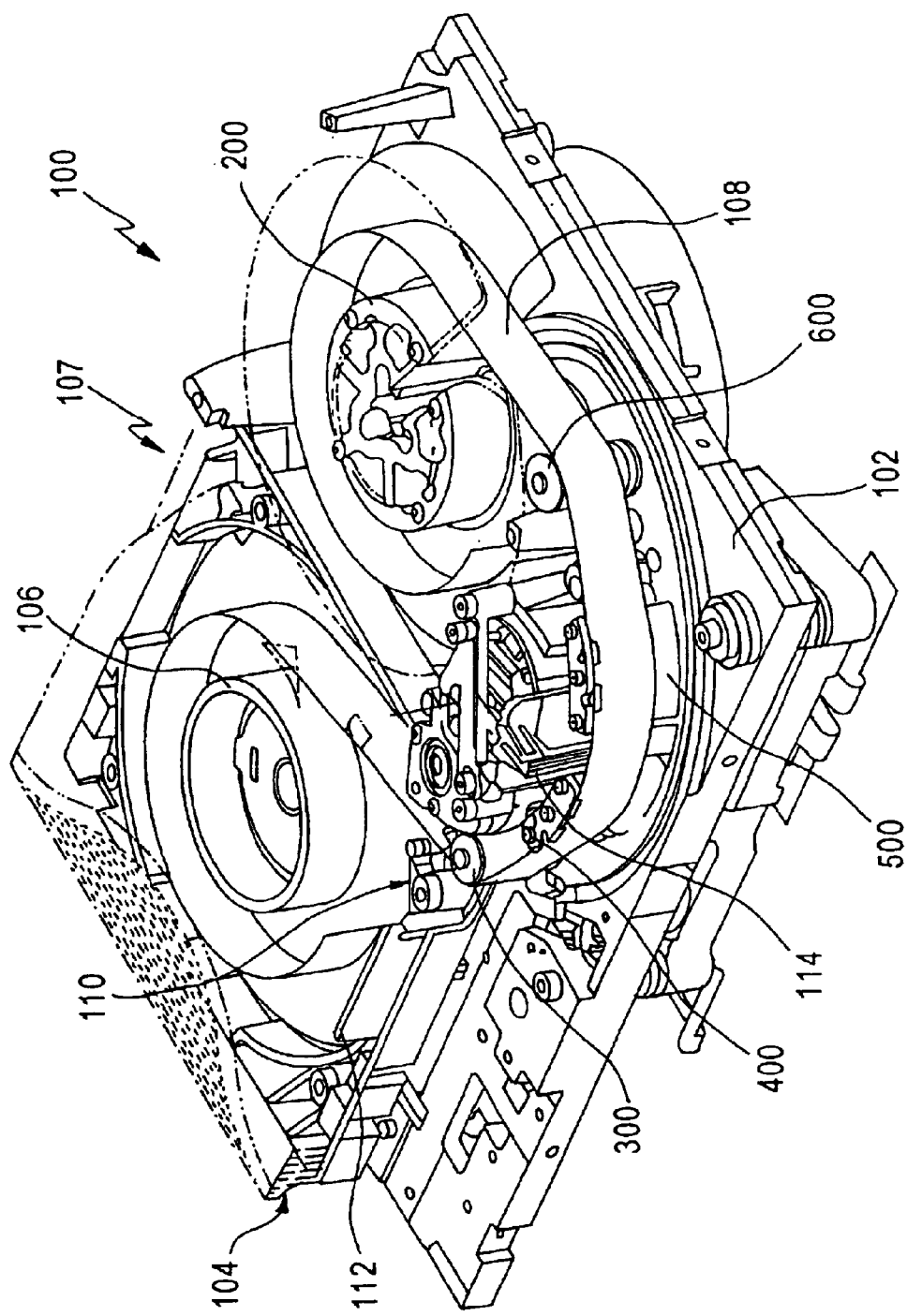
FIG. 1 is a perspective view of a tape path for a single reel cartridge tape drive according to the invention.
Figure 2:
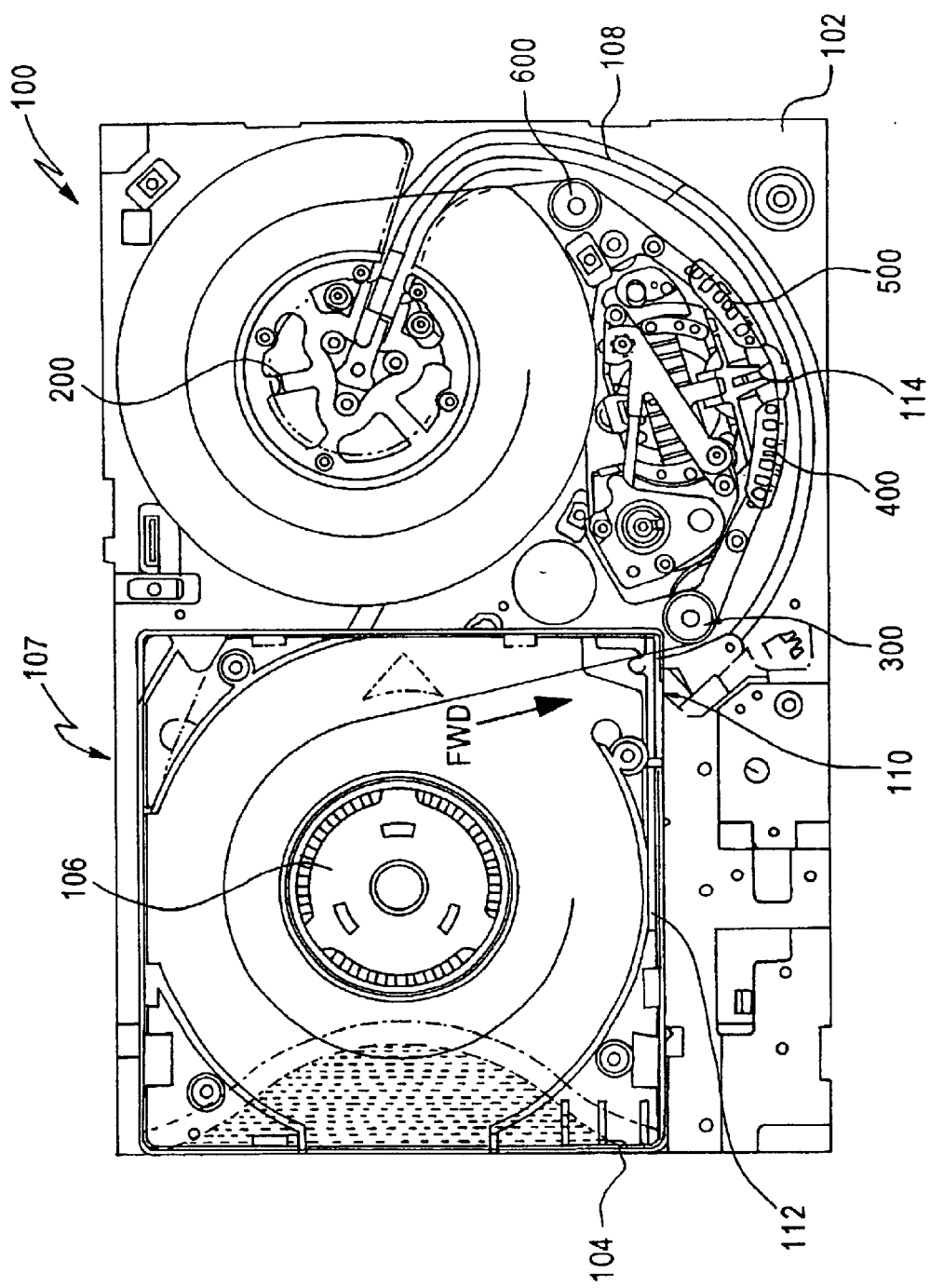
FIG. 2 is a top view of the tape path of FIG. 1.

Referring now to the drawings, and initially to FIGS. 1 and 2, there will be seen a tape drive unit 100. The tape drive unit comprises a main base plate 102 and a housing (not shown). A cartridge 104 containing the supply reel or cartridge reel 106 is inserted into a cartridge receiving area 107 of the tape drive 100. A tape 108 is wound on the supply reel 106. The cartridge 104 is equipped with a slot 110 that is covered by a door 112 when the cartridge 104 is not inserted into the drive 100. The slot 110 allows the tape 108 to pass outside of the cartridge 104 when the drive 100 is in use. The door 112 protects the tape 108 when the cartridge 104 is not inserted in the tape drive 100. The door 112 is opened by a mechanism (not shown) once it is inserted into the tape drive.

The tape drive 100 also has a take-up reel 200, which is shown in more detail in FIGS. 8A–8C. The take-up reel 200 draws the tape 108 from the supply reel 106 along the tape path and winds the tape 108 in the forward read/write mode. The tape drive 100 also has a magnetic read/write head 114 that reads from and writes to the tape 108. The tape 108 must be drawn across the magnetic read/write head 114 at a vertical location that does not change substantially across the entire length of the tape 108.

Disposed on either side of the magnetic read/write head 114 are a guide roller assembly 300, 600 and a fixed guide assembly 400, 500. The forward guide roller assembly 300 and the forward fixed guide assembly 400 are placed between the tape cartridge 104 and the magnetic read/write head assembly 114. The rearward fixed guide assembly 500 and the rearward guide roller assembly 600 are disposed between the magnetic read/write head assembly 114 and the take-up reel 200. In other words, as the tape 108 is drawn from the supply reel 106 to the take-up reel 200, the tape 108 first passes the forward guide roller 300, then the forward fixed guide 400, the magnetic read/write head 114, the rearward fixed guide 500, and finally passes the rearward guide roller prior to being wound by the take-up reel assembly 200.

The forward guide roller 300 is positioned in the vicinity of the slot of the cartridge. The forward guide roller 300 is positioned to ensure that the tape 108 exits properly from the cartridge, for instance, so that the tape 108 will not contact the cartridge as the cartridge reel goes from a fully loaded condition to an empty condition. Moreover, the location of the forward guide roller 300 provides suitable angles and ranges (preferably, 66 degrees at the beginning of the tape and 45 degrees at the end of the tape) around the guide roller 300 and provides a maximum distance between the supply reel 106 and the forward guide roller 300 and a maximum distance between the forward guide roller 300 and the forward fixed guide 400.

The forward fixed guide 400 is positioned to provide the necessary wrap of the tape 108 at the magnetic read/write head 114. Based on the geometry of the read/write head 114, a certain wrap angle of the tape is necessary for a proper head tape interface. The correct wrap angle also limits tape surface wear and maintains the head air bearing effects.

The tape path is symmetrical about the read/write head assembly 114 to ensure that the tape 108 is subject to the same forces and the like, regardless of whether the tape drive 100 is operating in the forward mode or the reverse mode. In other words, the distance and tape path between the forward fixed guide 400 and the magnetic read/write head 114 are substantially identical to the distance and tape path between the rearward fixed guide 500 and the magnetic read/write head 114. The distance and tape path between the forward guide roller 300 and the forward fixed guide 400 are substantially identical to the distance and tape path between the rearward guide roller 600 and the rearward fixed guide 500.

As shown in FIGS. 3A–3C, the take-up reel comprises a take-up hub 202 with flanges 204, 206 disposed on either side of the hub 202. The top flange 204 is mounted to the take-up hub 202 via a plurality of screws 208. The screws 208 are inserted through a plurality of screw-holes 210 in the flange 204. The screw-holes 210 are distributed substantially evenly about the inner periphery of the top flange 204. The screws 208 are then inserted into the corresponding holes 212 in take-up hub 202 and tightened.

The bottom flange 206 is mounted to the take-up hub in substantially the same manner. That is, a plurality of screws 214 are inserted through a plurality of screw-holes 216 in the flange 206. The screw-holes 216 are distributed substantially evenly about the inner periphery of the bottom flange 206. The screws 214 are then inserted into the corresponding holes 218 in take-up hub 202 and then tightened firmly to hold the bottom flange 206 in place.

In the embodiment of FIGS. 3A–3C, there are five screws 208 fixing the top flange 204 to the take-up hub 202 and five screws fixing 214 fixing the bottom flange 206 to the take-up hub 202. The arrangement of the screws 208, 214 ensures that the clamping force is evenly distributed across the flanges 204, 206. Although five screws 208, 214 are shown, any number may be utilized so long as they are substantially evenly distributed about the inner periphery of each flange 204, 206. Also, other types of connecting fasteners may be used rather than screws.

Because the flanges have openings 220, 222, counterweights 224, 226 are inserted into the take-up hub 202. The counterweights 224, 226 ensure that the weight of the take-up reel assembly 200 is well-balanced and that the take-up reel assembly 200 is not adversely affected by centrifugal forces and not subject to unnecessary vibrations.

There are several advantages to the depicted embodiment of the take-up reel 200. Among these advantages is that each of the flanges 204, 206 has smooth and uninterrupted surfaces to minimize air turbulence as the flanges 204, 206 rotate during the forward or backward read/write modes of the tape drive 100. A substantially laminar air flow results under the flanges 204, 206, which greatly reduces unwanted movement of the tape 108 during rapid start/stop of the tape 108. Moreover, each flange 204, 206, as shown in FIG. 8C, is tapered to prevent the tape 108 from contacting the flanges 204, 206 during the read/write modes. As a result, the geometry of the take-up reel assembly 200 provides an excellent wind quality.

Figure 4A:
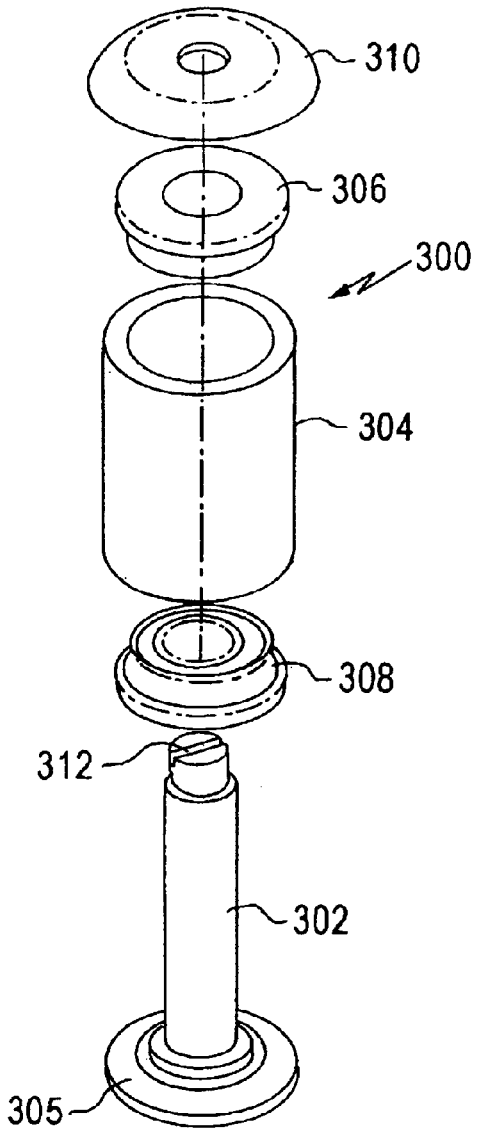
FIGS. 4A–4C are several views of the forward guide roller assembly of FIG. 1.
Figure 4B:
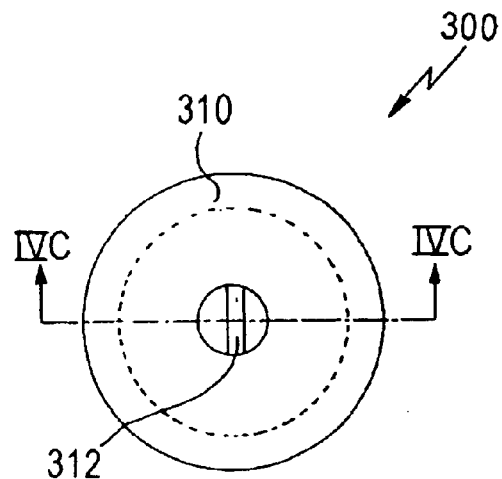
Figure 4C:
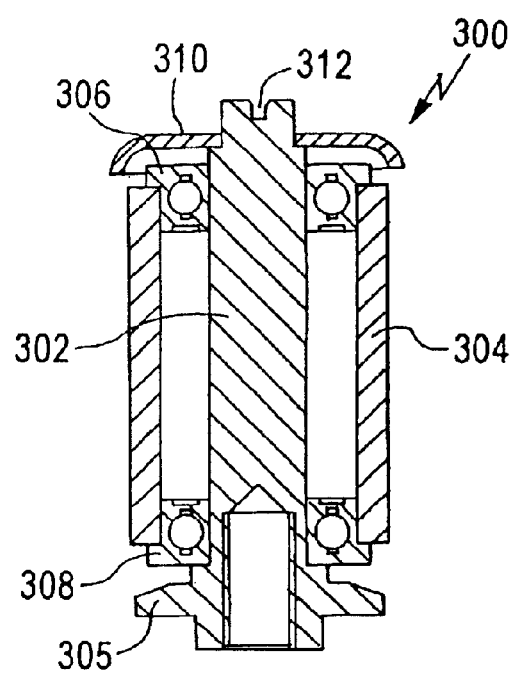

FIGS. 4A–4C show, in detail, the first guide roller 300. The forward guide roller 300 includes a shaft 302, which has an underside 305 that acts as a mounting surface for the forward guide roller 300. The shaft 302 is attached to the main base plate 102 of the tape drive 100 via a screw (not shown).

Disposed about the shaft 302 is a rotor or sleeve 304. The rotor 304 is supported by ball bearings 306, 308, which are located at either end of the shaft 302. A cover 310 is placed over a distal end of the shaft 302 to prevent contaminants from falling into the interior of the rotor 304 and the ball bearings 306, 308.

The distal end of the shaft 302 is also equipped with a slot 312 (or anti-rotation mechanism) that is used to prevent the shaft 302 from rotating during installation of the first guide roller 300 onto the main base plate 102 of the tape drive 100. For example, the head of a flat-head screw driver can be inserted into the slot 312 to prevent the shaft 302 from rotating while the screw (not shown) is inserted into the underside 305 at the proximal end of the shaft 302 through the main base plate 102.

Figure 5A:
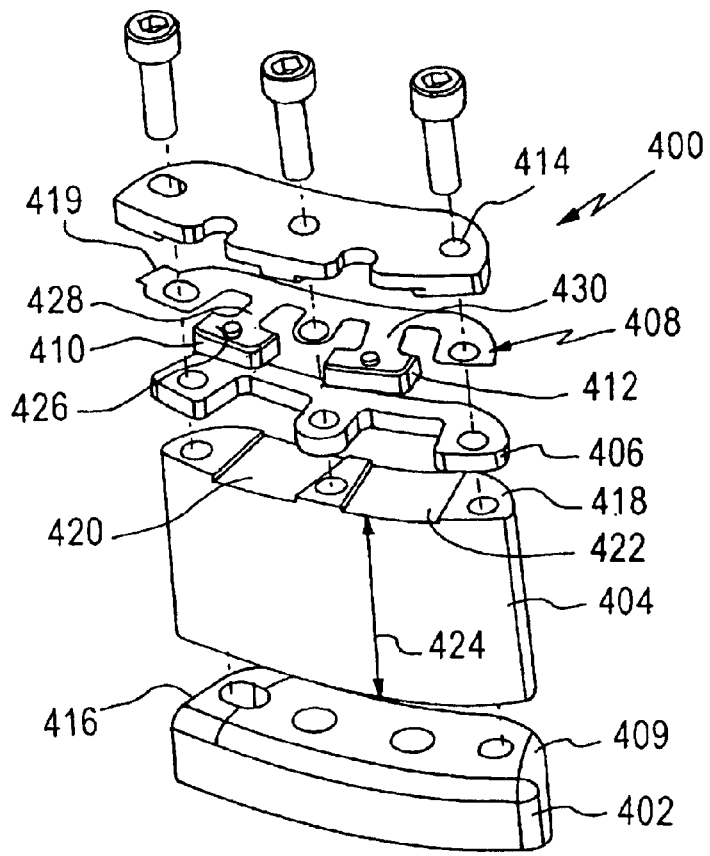
FIGS. 5A and 5B are several views of the forward fixed guide assembly of FIG. 1.
Figure 5B:
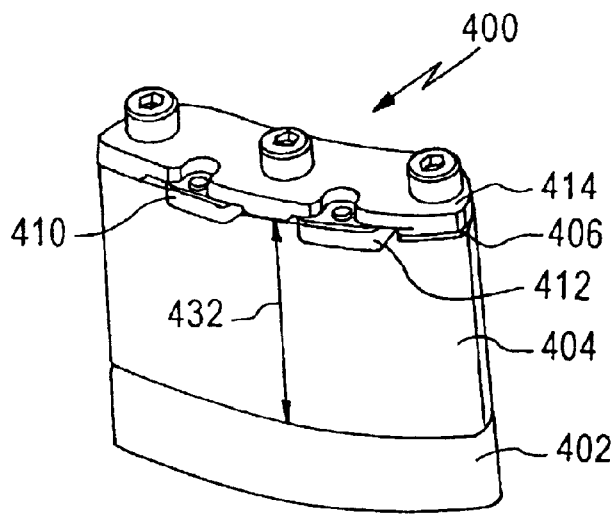

During the forward read/write mode, the tape 108 is drawn from the supply reel 106 across the first guide roller 300. As the tape 108 is drawn closer to the take-up reel 200, the tape path next comprises the forward fixed guide assembly 400, which is shown in detail in FIGS. 5A and 5B. The forward fixed guide assembly 400 is located on the main base plate 102 using a plurality of locating pins (not shown).

The forward fixed guide assembly 400 comprises a fixed guide mount 402 for mounting the forward fixed guide assembly 400 to the main base plate 102 of the tape drive 100. A fixed guide 404 is mounted to the fixed guide mount 402 via screws (not shown), for example. A spring 406 is mounted to the fixed guide 404 and a spring/pressure pad assembly 408 having pressure pads 410, 412 is mounted thereto. A cover 414 is secured to the top of the forward fixed guide assembly 400.

The top surface 416 of the fixed guide mount 402 acts as a reference surface for the tape 108. In other words, the tape path is designed such that the bottom edge of the tape 108 travels along the top surface 416 of the fixed guide mount 402. The fixed guide mount 402 has a chamfer 409 to ensure that the tape 108 smoothly enters the fixed guide mount assembly 400.

The top surface 418 of the fixed guide 404 has two cutouts (or pad mounting surfaces) 420, 422, which are located at a certain distance 424 (a range of 12.0 to 12.5 mm, with a preferred distance of 12.25 mm) from the top surface 416 of the fixed guide mount 402. The distance 424 is smaller than the width of the tape 108.

The spring/pressure pad assembly 408 comprises two pressure pads 410, 412 and a spring finger 419. The pressure pads 410, 412 are attached to the spring finger 419 via an adhesive 426, although any bonding procedure may be used. The pressure pads 410, 412 rest on cutouts 420, 422 and act on the top edge of the tape 108 with a certain preload (a range of 1.2 to 1.0 grams with a preferable preload of 3.2 grams). As a result, the pressure pads 410, 412 serve to bias the tape 108 against the top surface 416 of the fixed guide mount 402.

The spring finger 419 has two fingers 428, 430 with different spring rates. Finger 428 has a spring rate of 200 grams/inch and finger 430 has a spring rate of 300 grams/inch. The finger 430 located nearer the magnetic read/write head 114 has a higher spring rate than the other finger 428. As a result, the vertical position of tape 108 is corrected gently as the fingers 428, 430 push down on the top edge of the tape 108 forcing the tape 108 towards the top surface 416 of the fixed guide mount 402.

The height 432 of the fixed guide 404 other than where the cutouts are located, is larger than the width of the tape 108. Axial motions of the tape 108 cause the pressure pads 410, 412 to translate vertically. In response to this vertical translation, the pressure pads 410, 412 act forcibly downward on the top edge of the tape 108. The increased height in the non-cutout areas of fixed guide 404, which is greater than the width of tape 108, provides support for tape 108 and ensures that the tape 108 does not buckle.

The cover 414 protects the pressure pads 410, 412 and the tape path from contamination. The cover 414 also acts as a stop to limit the vertical translation of the fingers 428, 430. The cover 414, thus, limits the spring deflection of fingers 428, 430 to an amount below the elastic limit or stress. If the fingers 428, 430 were allowed to deflect beyond this limit, then permanent deformation or "set" may result.

Tape 108 may be offset in the vertical direction due to manufacturing tolerances between the cartridge reel location and the fixed guide assembly 400 in fabricating tape drive 100. Also, there is axial runout of the tape from the supply reel 106. The dynamic runout, or tape wander, in the vertical direction is controlled very effectively by the fixed guide assembly 400 and, more specifically, by the action of the pressure pads 410, 412 on the top edge of tape 108. The fixed guide assembly 404 provides support to the tape 108 across its entire width and provides pressure to the tape 108 in the zones where the pressure pads 410, 412 are located.

The forward fixed guide assembly 404 also is located precisely to provide the necessary wrap of tape 108 at read/write head assembly 114. The location is also chosen to limit surface wear of tape 108 and to maintain the head air bearing effects. The surface of fixed guide 402 is curved, which provides a higher tape stiffness at the tape edges than the stiffness that results from a straight tape path.

The guide mount 400, the fixed guide 402, and the pressure pads 410, 412 are constructed from a material, such as a ceramic, such that they will not wear out during the life span of the tape drive 100. Moreover, the material is selected such that it provides electrical conductivity to "bleed" static charges that are present in plastic films.

Figure 6A:
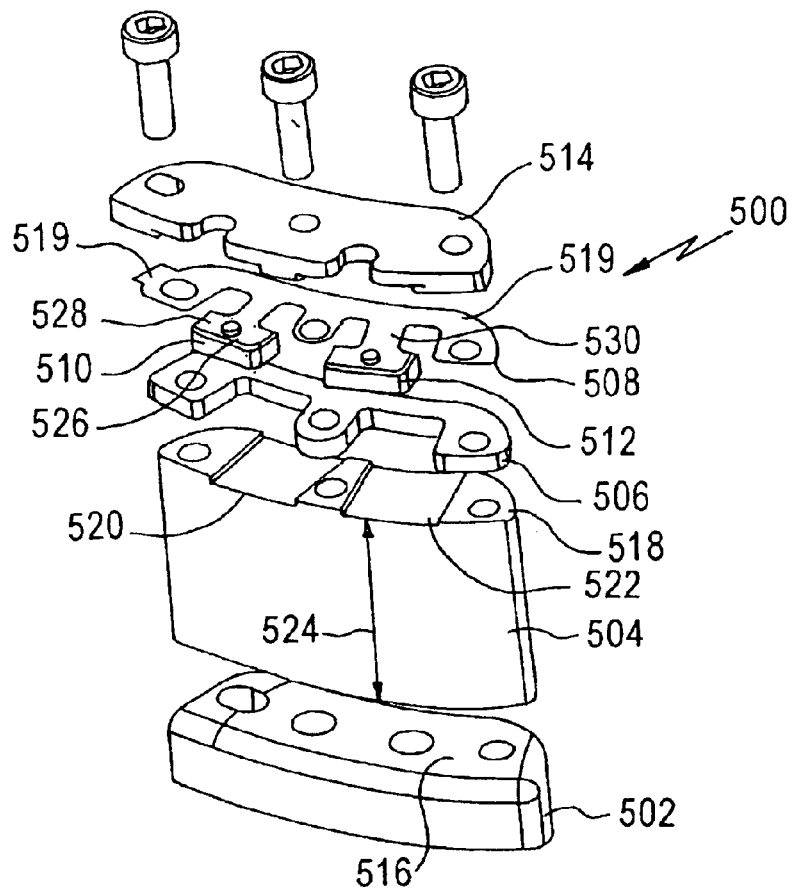
FIGS. 6A and 6B are several views of the rearward fixed guide assembly of FIG. 1.
Figure 6B:
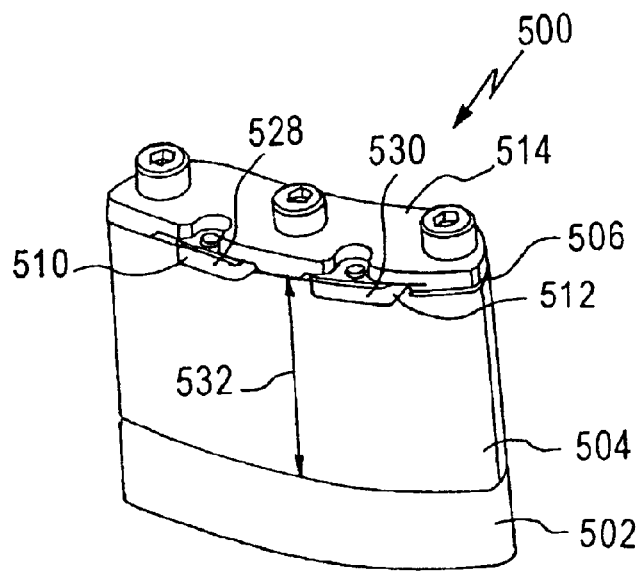

The rearweard fixed guide assembly 500, which is shown in FIGS. 6A and 6B, is identical to the forward fixed guide assembly 400. That is, The rearward fixed guide assembly 500 comprises a fixed guide mount 502 for mounting the rearward fixed guide assembly 500 to the main base plate 102 of the tape drive 100. A fixed guide 504 is mounted to the fixed guide mount 502 via screws (not shown), for example. A spring 506 is mounted to the fixed guide 504 and a spring/pressure pad assembly 508 having pressure pads 510, 512 is mounted thereto. A cover 514 is secured to the top of the rearward fixed guide assembly 500.

The top surface 516 of the fixed guide mount 502 acts as a reference surface for the tape 108. In other words, the tape path is designed such that the bottom edge of the tape 108 travels along the top surface 516 of the fixed guide mount 502. The fixed guide mount 502 has a chamfer 509 to ensure that the tape 108 smoothly enters the fixed guide mount assembly 500.

The top surface 518 of the fixed guide 504 has two cutouts (or pad mounting surfaces) 520, 522, which are located at a certain distance 524 (a range of 12.0 to 12.5 mm, with a preferred distance of 12.25 mm) from the top surface 516 of the fixed guide mount 502. The distance 524 is smaller than the width of the tape 108.

The spring/pressure pad assembly 508 comprises two pressure pads 510, 512 and a spring finger 519. The pressure pads 510, 512 are attached to the spring finger 519 via an adhesive 526, although any bonding procedure may be used. The pressure pads 510, 512 rest on cutouts 520, 522 and act on the top edge of the tape 108 with a certain preload (a range of 1.2 to 1.0 grams with a preferable preload of 3.2 grams). As a result, the pressure pads 510, 512 serve to bias the tape 108 against the top surface 516 of the fixed guide mount 502.

The spring finger 519 has two fingers 528, 530 with different spring rates Finger 528 has a spring rate of 200 grams/inch and finger 530 has a spring rate of 300 grams/inch. The finger 528 located nearer the magnetic read/write head 114 has a higher spring rate than the other finger 530. As a result, the vertical position of tape 108 is corrected gently as the fingers 528, 530 push down on the top edge of the tape 108 forcing the tape 108 towards the top surface 516 of the fixed guide mount 502.

The height 532 of the fixed guide 504, other than where the cutouts are located, is larger than the width of the tape 108. Axial motions of the tape 108 cause the pressure pads 510, 512 to translate vertically. In response to this vertical translation, the pressure pads 510, 512 act forcibly downward on the top edge of the tape 108. The increased height in the non-cutout areas of fixed guide 504, which is greater than the width of tape 108, provides support for tape 108 and ensures that the tape 108 does not buckle.

The cover 514 protects the pressure pads 510, 512 and the tape path from contamination. The cover 514 also acts as a stop to limit the vertical translation of the fingers 528, 530. The cover 528, 530, thus, limits the spring deflection of fingers 514 to an amount below the elastic limit or stress. If the fingers 528, 530 were allowed to deflect beyond this limit, then permanent deformation or "set" may result.

Tape 108 may be offset in the vertical direction due to manufacturing tolerances between the cartridge reel location and the fixed guide assembly 500 in fabricating tape drive 100. Also, there is axial runout of the tape from the supply reel 106. The dynamic runout, or tape wander, in the vertical direction is controlled very effectively by the fixed guide assembly 500 and, more specifically, by the action of the pressure pads 510, 512 on the top edge of tape 108. The fixed guide assembly 504 provides support to the tape 108 across its entire width and provides pressure to the tape 108 in the zones where the pressure pads 510, 512 are located.

The rearward fixed guide assembly 504 also is located precisely to provide the necessary wrap of tape 108 at read/write head assembly 114. The location is also chosen to limit surface wear of tape 108 and to maintain the head air bearing effects. The surface of fixed guide 502 is curved, which provides a higher tape stiffness at the tape edges than the stiffness that results from a straight tape path.

The guide mount 500, the fixed guide 502, and the pressure pads 510, 512 are constructed from a material, such as a ceramic, such that they will not wear out during the life span of the tape drive 100. Moreover, the material is selected such that it provides electrical conductivity to "bleed" static charges that are present in plastic films.

The rearward guide roller 600, which is shown in FIGS. 7A–7D and located near take-up reel 200, is substantially similar to the forward guide roller 300. As such, the rearward guide roller 600 includes a shaft 602, which has an underside that acts a mounting surface 604 for the rearward guide roller 600. The shaft 602 is attached to the main base plate 102 of the tape drive 100 via a screw (not shown).

Disposed about the shaft 602 is a rotor or sleeve 604. The rotor 604 is supported by ball bearings 606, 608, which are located at either end of the shaft 602. A cover 610 is placed over the a distal end of the shaft 602 to prevent contaminants from falling into the interior of the rotor 604 and the ball bearings 606, 608.

The distal end of the shaft 602 is also equipped with a slot 612 (or anti-rotation mechanism) that is used to prevent the shaft 602 from rotating during installation of the first guide roller onto the main base plate 102 of the tape drive 100. For example, the head of a flat-head screw driver can be inserted into the slot 612 to prevent the shaft 602 from rotating while the screw (not shown) is inserted into the proximal end of the shaft 602 through the main base plate 102.

When the tape is travelling at a rate greater than 1 m/sec, an air bearing is formed between the tape 108 and a conventional rotor 604. The normal operational velocity for the tape drive 100 is about 4 m/sec. At this speed, a conventional guide roller will have little effect on tape guiding when the tape drive 100 is operated. As a result, the tape 108 flys, resulting in negligible friction loss and negligible resistance to control by the reel hub 202.

After the tape 108 passes the rearward guide roller 600 it is wound on the take-up reel 200. The quality of the winding of the tape 108 on the take-up reel 200 is maintained due to the alignment of the take up reel 200 and the design and separation of the reel flanges.

In the reverse read/write mode, 108 flies over the rearward guide roller assembly 600. The pads 510 and 512 act to reduce vertical motion of tape 108 as the tape drive 100 starts and stops or switches from the reverse read/write mode to the forward read/write mode or vice versa. This ensures that tape path will be the same at the head locations in the forward and reverse read/write mode and that tape edge buckling will not occur.

In the tape drive according to the invention, the tension in tape is controlled by the reel that is supplying the tape, that is, the reel that is pulling the tape. If the tape drive is operating in the forward read/write mode, then the supply reel (i.e., the cartridge reel) controls the tension, but if the tape drive is operating the reverse read/write mode, then tension is controlled by the take-up reel. To ensure proper operation of the tape drive and optimal read/write performance, a certain tension (a range of 0.7 Newtons to 1.3 Newtons, with a preferable tension of 1 Newton) must be present at the read/write head. The drops in tension at the fixed guides and the guide rollers are minimal and predictable. Thus, the tension at the read/write head is very controllable with the tape path according to the invention.

In the inventive tape path, optimizing the size of the fixed guides, the materials used, and surface finishes, the area of tape contact is minimized. As a result, stiction is substantially avoided in high humidity environments.

In this disclosure there is shown and described only a preferred embodiment of the invention and but a few examples of its versatility. It is to be understood that the invention is capable of use in various other combinations and environments and is capable of changes or modifications within the scope of the inventive concept as expressed herein.

What is claimed is:

1. A tape drive having a cartridge receiving area adapted to receive a cartridge containing a recording medium on a supply reel, comprising:
   a take-up reel, wherein the take-up reel comprises:
     a take-up rotatably mounted to the tape drive; and
     a pair of flanges mounted on either side of the take-up hub;
   a magnetic read/write head disposed between the cartridge receiving area and the take-up reel;
   a pair of fixed guide assemblies disposed symmetrically about the magnetic read/write head, wherein each of the fixed guide assemblies comprises:
     a fixed guide mount fixed to the tape drive;
     a fixed guide attached to a top of the fixed guide mount; and
     a spring/pressure pad having at least one pressure pad mounted to the fixed guide, wherein the pressure pad applies pressure to a top edge of the recording medium when the tape drive is operational; and
   a forward guide roller and a rearward guide roller disposed symmetrically about the magnetic read/write head, the forward guide roller being located between the cartridge receiving area and the one of the pair of fixed guide assemblies and the rearward guide roller being located between the take-up reel and the other of the fixed guide assemblies, wherein each of the forward guide roller and rearward guide roller comprises:
     a shaft mounted to the tape drive; and
     a rotor disposed about the shaft;
   wherein the fixed guide of each of the fixed guide assemblies has:
     a top surface having at least one cutout, each cutout receiving one of the at least one pressure pad,
     a first height that is greater than a width of the recording medium,
     a second height at each of the at least one cutout that is smaller than a width of the recording medium,
     a vertical surface that is rounded smoothly, and
     a chamfered lower edge,
     wherein the fixed guide assembly further comprises a cover fixed to the spring/pressure pad and the fixed guide.

2. A tape drive as claimed in claim 1, wherein the spring/pressure pad comprises a spring having at least one finger, wherein one of the at least one pressure pad is fixed to one of the at least one finger.

3. A tape drive as claimed in claim 2, wherein the fixed guide has two cutouts, and wherein the spring/pressure pad has two spring fingers and two pressure pads, each of the pressure pads being mounted to a different one of the two spring fingers and each of the two spring fingers having different spring rates.

4. A tape drive as claimed in claim 3, wherein the fixed guide further comprises a spring disposed between the spring/pressure pad and the fixed guide.

5. A tape drive as claimed in claim 4, wherein each of the forward guide roller and the rearward guide roller further comprises:
   a pair of ball bearings disposed at either end of the shaft between an interior of the rotor and the shaft;
   a cover mounted to a distal end of shaft;
   a slot cut into the distal end of the shaft; and
   a mounting surface at the proximal end of the shaft.

6. A tape drive as claimed in claim 5, wherein a surface of the rotor of the rearward guide roller has a plurality of grooves.

7. A tape drive as claimed in claim 6, wherein the take-up reel further comprises:
   a plurality of fasteners disposed symmetrically about an inner periphery of each of the pair of flanges for mounting the flanges to the take-up hub; and
   at least one counterweight fixed to the take-up hub.

8. A tape drive having a cartridge receiving area adapted to receive a cartridge containing a recording medium on a supply reel, comprising:
   a take-up reel;
   a magnetic read/write head disposed between the cartridge receiving area and the take-up reel; and
   a pair of fixed guide assemblies disposed symmetrically about the magnetic read/write head, wherein each of the fixed guide assemblies comprises:
     a fixed guide mount fixed to the tape drive;
     a fixed guide attached to a top of the fixed guide mount; and
     a spring/pressure pad having at least two pressure pads mounted to the fixed guide, wherein the pressure pads apply pressure to a top edge of the recording medium to bias the recording medium against the fixed guide mount when the tape drive is operational;
   wherein the fixed guide of each of the fixed guide assemblies has:
     a top surface having at least one cutout, each cutout receiving one of the at least two pressure pads, a first height that is greater than a width of the recording medium, a second height at each of the at least one cutout that is smaller than a width of the recording medium, a vertical surface that is rounded smoothly, and a chamfered lower edge, wherein the fixed guide assembly further comprises a cover fixed to the spring/pressure pad and the fixed guide.

9. A tape drive as claimed in claim 8, wherein the spring/pressure pad comprises a spring having at least one finger, wherein one of the at least two pressure pads is fixed to one of the at least one fingers.

10. A tape drive as claimed in claim 9, wherein the fixed guide has two cutouts, and wherein the spring/pressure pad has two spring fingers and two pressure pads, each of the pressure pads being mounted to a different one of the two spring fingers and each of the two spring fingers having different spring rates.

11. A tape drive as claimed in claim 10, wherein the fixed guide further comprises a spring disposed between the spring/pressure pad and the fixed guide.

12. A tape drive as claimed in claim 11, further comprising: a forward guide roller and a rearward guide roller disposed symmetrically about the magnetic read/write head, the forward guide roller being located between the cartridge receiving area and the one of the pair of fixed guide assemblies and the rearward guide roller being located between the take-up reel and the other of the fixed guide assemblies, wherein each of the forward guide roller and rearward guide roller comprises:

a shaft mounted to the tape drive; and a rotor disposed about the shaft.

13. A tape drive as claimed in claim 12, wherein each of the forward guide roller and the rearward guide roller further comprises:

a pair of ball bearings disposed at either end of the shaft between an interior of the rotor and the shaft;

a cover mounted to a distal end of shaft;

a slot cut into the distal end of the shaft; and a mounting surface at the proximal end of the shaft.

14. A tape drive as claimed in claim 13, wherein a surface of the rotor of the rearward guide roller has a plurality of grooves.

15. A tape drive as claimed in claim 14, wherein the take-up reel further comprises:

a plurality of fasteners disposed symmetrically about an inner periphery of each of the pair of flanges for mounting the flanges to the take-up hub; and at least one counterweight fixed to the take-up hub.

* * * * *